Sept. 6, 1949.  W. A. PLEDGER  2,481,341
VENTILATING DEVICE FOR KITCHENS AND KITCHEN STOVES Filed Oct. 3, 1945  2 Sheets-Sheet 1

INVENTOR.
WILLIAM A. PLEDGER
BY Alexander Riaboff
HIS ATTORNEY

Sept. 6, 1949. W. A. PLEDGER 2,481,341
VENTILATING DEVICE FOR KITCHENS AND KITCHEN STOVES
Filed Oct. 3, 1945 2 Sheets-Sheet 2

INVENTOR.
WILLIAM A. PLEDGER
BY Alexander Riaboff
HIS ATTORNEY

Patented Sept. 6, 1949

2,481,341

UNITED STATES PATENT OFFICE 2,481,341

VENTILATING DEVICE FOR KITCHENS AND KITCHEN STOVES

William A. Pledger, San Francisco, Calif.

Application October 3, 1945, Serial No. 620,035

8 Claims. (Cl. 126—299)

1

This invention relates to a ventilating device for a kitchen and a kitchen stove.

In all kitchens, particularly in restaurant kitchens, during preparation of food, a stove emanates various odors, fumes, steam, fat and grease vapors. In addition to this, the cooking stove heats the air therearound which air raises upwardly and gradually fills the room starting from the ceiling and progressing gradually downwardly. This excessive heat is undesirable and has to be eliminated.

The kitchen odors, steam, fat and grease evaporation, as well as the products of combustion of the stove itself in some cases are taken care of by a specially constructed ventilator, and the temperature in the kitchen, or a room where the stove is, is kept down by a separate ventilating system.

It is the object of this invention to provide a unified ventilating system for a kitchen, which shall take care of kitchen odors and evaporation, products of combustion and of the excessive hot air where the stove is installed.

Another object of this invention is to provide a ventilating device of the type described which, while disposing of excessive heat, kitchen fumes and products of combustion, cools the wall behind the stove and thereby minimizes the fire hazards.

Still another object of this invention is to provide a device which is simple in construction, cheap in maintenance and efficient for the purpose intended.

Other objects and advantages will appear as the specification proceeds and the particular features of the invention will be specifically pointed out in the appended claims.

My invention is illustrated in the accompanying drawings in which

Figure 1:
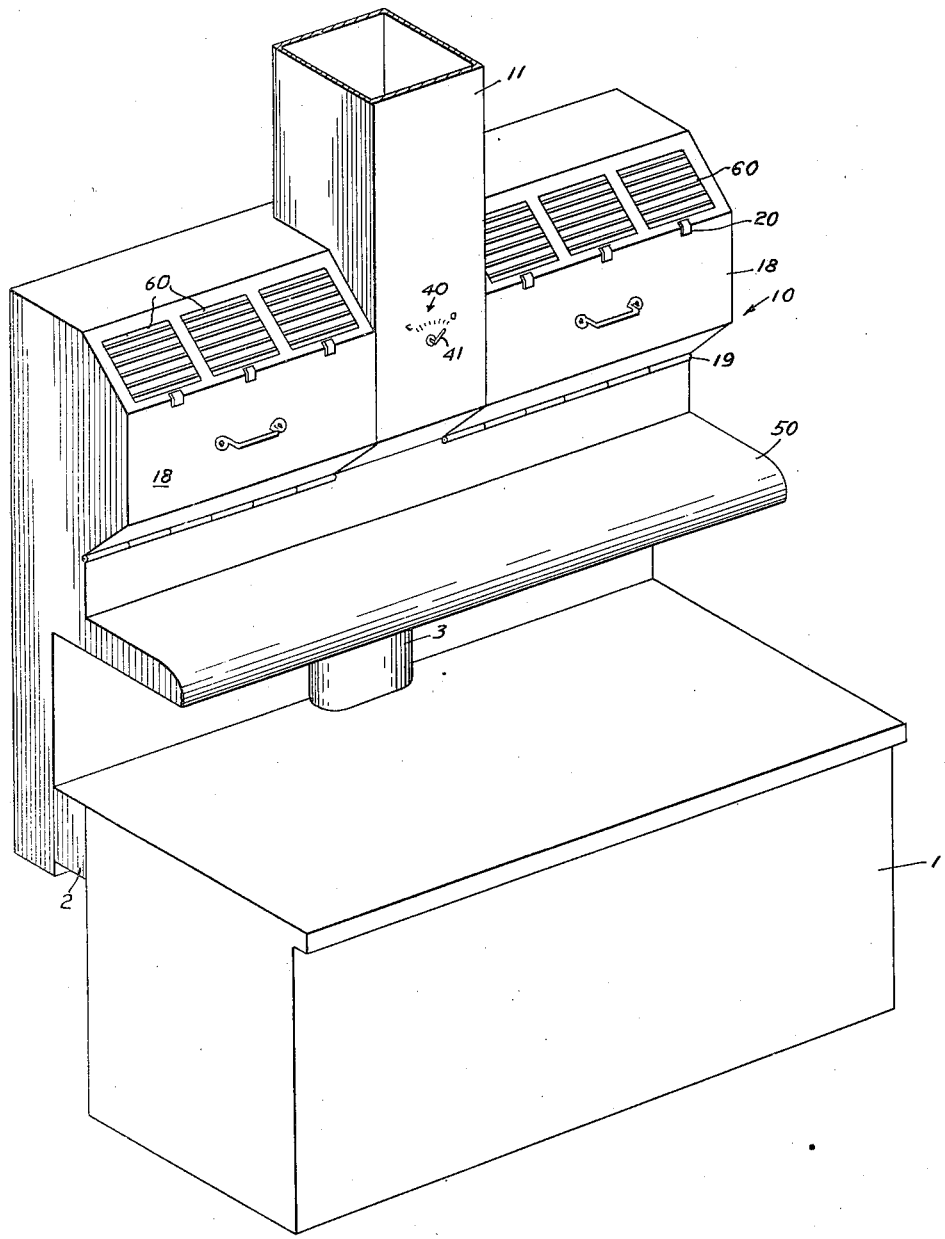
Fig. 1 is a perspective view of the ventilating device and stove to which the same is attached.
Figure 2:
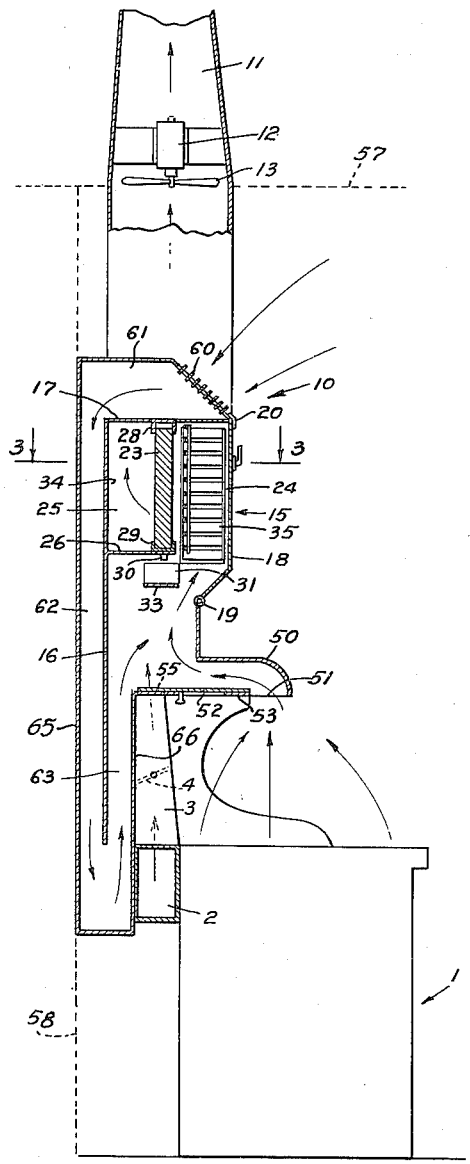
Fig. 2 is a vertical cross-section through the device taken along the line 2—2 of Fig. 3.
Figure 3:
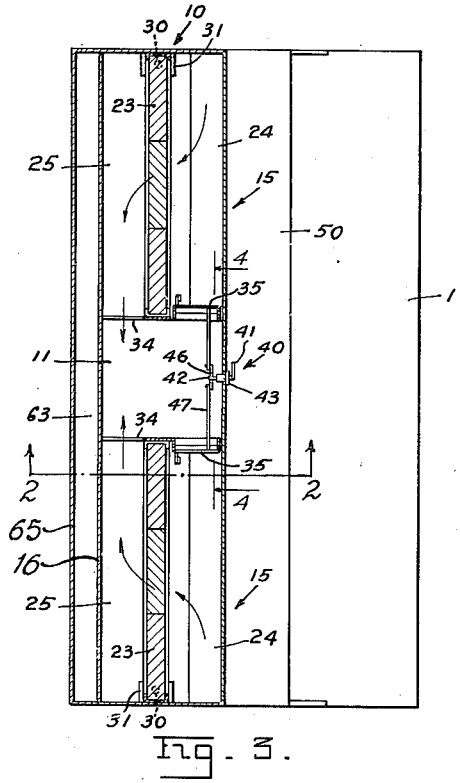
Fig. 3 is a horizontal cross-section of the device taken along the line 3—3 of Fig. 2.

In detail, 1 denotes a range, or a stove, which may be of any construction or design. The stove 1 has a plurality of usual ovens and a flue 2 which runs on the back side of the stove at the top thereof and is connected with said ovens for the purpose of eliminating fumes and products of combustion therefrom. The flue 2 is connected

2 to a vertical pipe 3 which directs said fumes and products of combustion out and away from the stove. The pipe 3 has a usual damper 4.

During cooking, the stove is heated and heats the air therearound, and odors, smells and fumes from cooked, fried, or burnt food spread rapidly all over the place. To eliminate such undesirable effects a ventilating device generally indicated at 10 is provided. The device 10 represents a box-like structure coextensive with the length of said stove. It is preferably made out of sheet metal and comprises a centrally located duct or stack 11 having an electric motor 12 and a fan 13 operatively connected thereto for the purpose of providing a forced draft therethrough.

Through the stack 11 all the products of combustion, fumes and excessive heat are discharged into the air outside the room or building.

On each side of the stack 11 there is an elongated chamber 15 formed by a vertical partition 16, a top partition 17 and a front door 18. The latter is supported at its bottom by hinges 19 and is normally held in closed position by some retaining or locking devices such as hooks 20 at the top of said door. The bottom of the chamber 15 is opened to admit hot air, vapor, products of combustion and gases therethrough. The chamber 15 has for its purpose to filter said air and gases passing therethrough and to separate and collect fat and grease contained in said air and gases. For that purpose a plurality of filters 23 are provided in said chamber dividing the same into an inner compartment 24 communicating with the stack 11 and a mixing compartment 25.

The filters 23 are supported by a horizontal partition 26 extending from the vertical partition 16. The tops and bottoms of said filters are confined in the troughs 28 and 29 respectively. The latter trough serves as a grease and oil collector, and has a spout 30 on the end thereof from which said grease and oil drip into a container 31. The latter is supported under said spout by a support 33.

Fumes, hot air and products of combustion pass from the compartment 24 through the filters 23 into the compartment 25, and from the latter into the stack 11 through an opening 34 provided in the wall of said stack.

Figure 4:
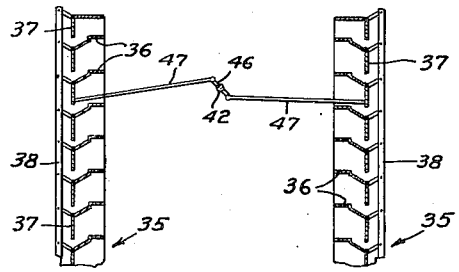
Fig. 4 is a partial cross-section taken along the line 4—4 of Fig. 3 showing the arrangement of the louver staves and the mechanism of the adjustable automatic damper.

The compartment 24 communicates with said stack through two adjustable automatic dampers 35 each located within said compartment 24 in close proximity with the filters 23. Each damper 35 consists of a frame 39 located in an opening 45 in the wall of the stack 11, which wall serves as a partition between said compartment 24 and the stack. The frame 39 rotatably carries a plurality of louver slats 37 and has a plurality of cross partitions 36 attached thereto. Fig. 4 shows said louver slats in normal open position so that the air and gases pass between said slats and cross partitions into the stack 11. The slats 37 being operatively connected to a common bar 38 operate as a unit and are so balanced as to be closed by the draft created by the fan 13 in the stack 11, but to stay open when said fan is inoperative. An indicator 40 is provided on the front wall of the stack 11 to show whether said damper is closed or open. It consists of a bar 41 affixed to a shaft 42 which is adapted to rotate in a suitable bearing 43. The shaft 42 extends into the stack 11 a certain distance and terminates with a lever 46 passing through said shaft. The ends of said lever 46 are connected by suitable links 47 to the slats 37. The motion of the latter will rotate the shaft 42 and change the position of the bar 41 so as to indicate whether said dampers are closed or open. The bar 41 may also be manually operated to open or close said dampers.

At the bottom of the chamber 15 there is a suction spout 50 extending therefrom to substantially the middle of the stove or range 1. The spout 50 extends throughout the length of the stove and has an opening 51 at the bottom side near the end thereof. The opening 51 extends the whole length of the spout. Means are provided in said spout to regulate the width of said opening, said means comprising a plurality of slides 52 adapted to slide on the lower side 53 of the spout and to partially or totally close said opening 51 over a portion of the stove where the same is desirable.

Gases, vapors and fumes from the food cooked on the surface of the stove 1 are sucked into the spout 50 through the opening 51. The latter opening is located substantially over the middle of the stove and therefore less force is required to take in the fumes than in case said opening 51 were located anywhere else. Furthermore, the air being drawn from the stove substantially straight up is undisturbed by any sidesweeping action of draft which fact contributes considerably to proper preparation of food by drawing the heat up from the top of the stove against the sides of the cooking vessels.

The pipe 3 extends from the flue 2 to the lower side 53 of the spout 50 and communicates with the chamber 15 through an opening 55 in said lower side 53. The gases and fumes from the ovens are carried through the flue 2 into the pipe 3 and therefrom into the compartment 24.

As has been stated heretofore, the stove 1 heats the air therearound and the hot air rises upwardly to the ceiling 57 and gradually fills the kitchen, or the room where the stove is located, which may cause considerable discomfort to the people present therein.

Means are provided in said ventilating device 10 for disposing of said hot air, said means including a plurality of adjustable louvers 60 arranged above the chamber 15 through which louvers 60 hot air is drawn into a hot air chest 61, from which it is further drawn into a vertical passage 62 which is located on the back side of the device 10 throughout the length thereof and formed by the partition 16 and the back wall 65. The passage 62 extends downwardly along the wall 58 of the kitchen and somewhat below the flue 2. An upward passage 63 formed by the partition 16 and the front wall 66 of the device is provided from the lower end of the passage 62 into the compartment 24.

Hot air drawn from the room passes the louvers 60, the chest 61 and enters the downward passage 62. After reaching the bottom of said passage it enters the upward passage 63 and therefrom it enters the compartment 24. Hot air has considerably lower temperature than the stove itself, or gases, fumes and air which enter the compartment 24 through the suction spout 50 and the pipe 3. The air passing through the passage 62 keeps the back side of the stove and the wall 58 and ventilating device 10 comparatively cool and thus eliminates the possibility of fire being started by an overheated stove, stove pipe or ventilating device. It should be particularly noted that the flue 2 is exposed to a constant stream of air and is cooled thereby to a dangerless point. The air entering the compartment 24 from the upward passage 63 is mixed therein with the very hot fumes and products of combustion of the ovens delivered by the pipe 3 and the suction spout 50. The resulting mixture is of considerably lower temperature than the said fumes and products of combustion which assures better filtering results: more grease and oil is taken out of the fumes and air passing through said filters.

By arranging the end of the passage 62 well below the openings 51 and 55, the possibility of gases and fumes, passing through said openings, entering said passage is eliminated.

It should be also noted that the air drawn by the device 10 through the passages 62 and 63, passes through the filters 23 whereby additional filters for filtering said air which would otherwise be needed, are eliminated. By passing all fumes, air and products of combustion through said filters 23, the danger of contaminating ventilating ducts and pipes is also eliminated.

It may happen that the oven is fired without first starting the motor 12 in which case the fumes and products of combustion upon reaching the compartment 24 will practically be stopped by the filters 23 whereupon they will be diverted into the suction spout 50 and spread all over. In order to prevent this, the said above described adjustable automatic damper 35 is provided in the compartment 24. The latter, as has been heretofore stated, is normally open and all the fumes and products of combustion will escape through said damper into the stack 11. After the motor 12 has been stated, the damper 35 is automatically closed and the fumes, air and products of combustion are drawn through the filters 23, chamber 25 into the stack 11.

Due to the fact that the amount of air sucked through the louvers 60 and the suction spout 50 may be regulated by adjusting said louvers and the size of opening 51 of the spout 50, the temperature of the room may be maintained at the desired level and at the same time fumes and products of combustion are taken care of. The size of the opening 51 may be adjusted differently over various sections of stove depending upon whether the same is in use or not and upon the kind of food being prepared on a given section.

Having thus described the invention, I claim:

1. The combination of a cooking stove adapted to be disposed with its rear side adjacent to a wall, with a ventilating device comprising means forming a chamber above the stove; a plurality of air filters in said chamber dividing the same into a mixing and an inner compartment; said chamber having a spout for drawing fumes from the top of the stove into said mixing compartment; an air chest on the top of said chamber, said chest having means for admitting room air thereinto; means substantially coextensive with the length of the stove, for conducting air from said air chest downwardly to the rear of the stove and upwardly to the mixing compartment for mixing said air with the fumes of the stove; a stack; and means for drawing air from said mixing compartment through said filters into the inner compartment and into the stack.

2. The combination of a cooking stove adapted to be disposed with its rear side adjacent to a wall, with a ventilating device comprising means forming a chamber above the stove; a plurality of air filters in said chamber for separating grease from the air passing therethrough, said filters being arranged side-by-side and dividing said chamber into mixing and inner compartments; an open spout extending from the chamber above the top of the stove for drawing fumes from said top into said mixing compartment; an air chest on the top of said chamber and having means for admitting air thereinto; said device including a back wall, a partition and a front wall forming a passage substantially coextensive with the length of the stove from said air chest downwardly below the top of the stove and therefrom upwardly to the mixing compartment; a stack; and means for drawing air mixed with fumes from said mixing compartment through the filters into the inner compartment and into the stack.

3. The combination of a cooking stove adapted to be disposed with its rear side adjacent to a wall and including an oven, with a ventilating device comprising a stack; means connected to said stack for directing into said device fumes emanating from said stove; said means terminating and having an entrance opening above the middle of the stove, means for directing into said device combustion products from said oven; means substantially coextensive with the length of the stove and extending downwardly between said stove and said wall for drawing into said device room air above the device, said last means being arranged to draw room air downwardly and upwardly between said stove and said wall; a filter arranged in the device for passing therethrough said fumes, combustion products and room air; a means arranged in the stack for drawing said fumes, products of combustion and air through the filter and into the stack.

4. The combination of a cooking stove adapted to be disposed with its rear side adjacent to a wall and including an oven, with a ventilating device substantially coextensive with the length of said stove, said device comprising a stack; means for directing into said device fumes emanating from the top of said stove, said means extending the length of the stove and terminating and having an opening above the middle of the same; means for directing into said device combustion products from said oven; means for drawing into said device room air above the device; said last mentioned means being arranged to draw room air downwardly adjacent to said wall and upwardly adjacent to said stove substantially the length of said stove; a filter arranged in said device for passing therethrough said fumes, products of combustion and room air; and means for drawing said fumes, products of combustion and room air through said filter and into said stack.

5. The combination of a cooking stove adapted to be disposed with its back adjacent to a wall, with a ventilating device comprising a box-like structure having a top, a bottom, two sides, a front and a back; a spout formed out of the front wall extending therefrom forwardly above the top of said stove and having an opening therein for drawing fumes from the top of the stove; an inner partition in said device which partition with the back of said device defines a downward passage for room air above the device, and said partition and the front forms an upward passage for said air, said passages extending downwardly back of said stove below the cooking surface thereof; a plurality of filters arranged in said device throughout the length thereof so as to form an inner compartment and a mixing compartment, said mixing compartment being in communication with said spout and the upward passage; a stack on said device; and means in said stack for drawing said fumes and air from the mixing compartment through said filters into the inner compartment and into the stack.

6. The combination of a cooking stove adapted to be disposed with its back adjacent to a wall, with a ventilating device comprising a box-like structure having a top, a bottom, two sides, a front and a back; said back sides and front extending below the cooking surface of the stove; a stack; means for directing into said device fumes emanating from the top of said stove, said means extending substantially the length of said stove; means for directing into said device room air above the device, said last mentioned means being arranged to draw room air downwardly adjacent to the back wall of said device and upwardly adjacent to the front wall thereof; a filter arranged in said device for passing therethrough said fumes and room air; and means for drawing said fumes and room air through said filter.

7. The combination of a cooking stove adapted to be disposed with its rear side adjacent to a wall and including an oven, with a ventilating device substantially coextensive with the length of said stove, said device comprising a stack; means for directing into said device fumes emanating from the top of said stove, said means extending the length of the stove and terminating and having an opening above the middle of the same; means for directing into said device combustion products from said oven; means for directing into said device room air above the device; said last mentioned means being arranged to direct room air downwardly adjacent to said wall and upwardly adjacent to said stove; a filter arranged in said device for passing therethrough said fumes, products of combustion and room air; means for drawing said fumes, products of combustion and room air through said filter and into said stack, said stack having an opening adjacent the filter; and an automatic damper arranged in the opening, and adapted to provide a bypass for air, fumes and products of combustion into the stack directly when the means for drawing fumes, products of combustion and room air is inoperative.

8. The combination of a cooking stove with a ventilating device substantially coextensive with the length of said stove; said device comprising a stack; means for directing into said device fumes emanating from the stove; a filter arranged in said device for passing said fumes therethrough; means for drawing said fumes through said filter and into said stack; said stack having an opening; and means arranged in said opening to provide a bypass for said fumes into the stack directly when the means for drawing fumes through said filter is inoperative.

WILLIAM A. PLEDGER.

REFERENCES CITED

The following references are of record in the file of this patent:

UNITED STATES PATENTS

| Number | Name | Date |
|---|---|---|
| 217,353 | Erdman | July 8, 1879 |
| 273,216 | Zerban | Feb. 27, 1883 |
| 607,976 | Amos | July 26, 1898 |
| 1,377,694 | Koehler | May 10, 1921 |
| 1,477,590 | Powell | Dec. 18, 1923 |
| 1,584,619 | Lloyd | May 11, 1926 |
| 1,732,315 | Ray | Oct. 22, 1929 |
| 1,825,245 | Nitka | Sept. 29, 1931 |
| 1,895,371 | Briegel | Jan. 24, 1933 |
| 2,052,596 | Barrett | Sept. 1, 1936 |
| 2,081,640 | Petersen | May 27, 1937 |
| 2,112,041 | Miller | Mar. 22, 1938 |
| 2,361,011 | Chambers | Oct. 24, 1944 |
| 2,369,375 | Sonntag | Feb. 13, 1945 |
| 2,376,571 | Brumbaugh | May 22, 1945 |
| 2,392,038 | Gaylord | Jan. 1, 1946 |
| 2,398,508 | Shoemaker | Apr. 16, 1946 |

FOREIGN PATENTS

| Number | Country | Date |
|---|---|---|
| 370,159 | Great Britain | Apr. 7, 1932 |
| 370,160 | Great Britain | Apr. 7, 1932 |
| 537,140 | Germany | Oct. 30, 1931 |